US009777664B2

(12) United States Patent
Foufas et al.

(10) Patent No.: US 9,777,664 B2
(45) Date of Patent: Oct. 3, 2017

(54) METHOD AND SYSTEM FOR CONTROLLING FUEL INJECTION (71) Applicant: VOLVO TRUCK CORPORATION, Göteborg (SE)

(72) Inventors: Johannes Foufas, Gothenburg (SE); Johan Larsson, Uddevalla (SE)

(73) Assignee: Volvo Truck Corporation, Göteborg (SE)

( * ) Notice: Subject to any disclaimer, the term of this patent is extended or adjusted under 35 U.S.C. 154(b) by 116 days.

(21) Appl. No.: 14/648,737

(22) PCT Filed: Dec. 4, 2012

(86) PCT No.: PCT/EP2012/004988
§ 371 (c)(1),
(2) Date: Jun. 1, 2015

(87) PCT Pub. No.: WO2014/086380
PCT Pub. Date: Jun. 12, 2014

(65) Prior Publication Data
US 2015/0345418 A1 Dec. 3, 2015

(51) Int. Cl.
*B60T 7/12* (2006.01)
*F02D 41/30* (2006.01)
(Continued)

(52) U.S. Cl.
CPC .......... *F02D 41/3011* (2013.01); *F02D 11/02* (2013.01); *F02D 41/0077* (2013.01);
(Continued)

(58) Field of Classification Search
CPC .. F02D 41/3011; F02D 11/02; F02D 41/0077; F02D 41/1454; F02D 41/2422;
(Continued)

(56) References Cited

U.S. PATENT DOCUMENTS 4,368,705 A * 1/1983 Stevenson ........... F02D 41/2422
123/357
4,662,340 A * 5/1987 Nagano ................... F02D 41/10
123/326
(Continued)

FOREIGN PATENT DOCUMENTS

CN 1076510 A 9/1993
CN 104245 C 3/1999
(Continued)

OTHER PUBLICATIONS

Japanese Official Action (Jul. 21, 2016) for corresponding Japanese Application 2015-545670.
(Continued)

*Primary Examiner* — John Kwon
(74) *Attorney, Agent, or Firm* — WRB-IP LLP (57) ABSTRACT

A method for controlling fuel injection of a combustion engine and a corresponding system includes providing at least a first predetermined air-fuel mixture map and determining a first air-fuel ratio based on at least one engine operating parameter and the at least first predetermined air-fuel mixture map; determining a second air-fuel ratio that is offset with a first constant value from the first air-fuel ratio, determining if a first operating mode or a second operating mode is selected; controlling engine fuel injection according to the first air-fuel ratio when a currently requested fueling rate results in a smaller air-fuel ratio than the first air-fuel ratio and the first operating mode is selected; or alternatively controlling engine fuel injection according to the second air-fuel ratio when a currently requested fueling rate results in a smaller air-fuel ratio than the second air-fuel ratio and the second operating mode is selected.

23 Claims, 3 Drawing Sheets

(51) Int. Cl.
*F02D 41/14* (2006.01)
*F02D 41/00* (2006.01)
*F02D 11/02* (2006.01)
*F02D 41/24* (2006.01)
*F02D 41/40* (2006.01)

(52) U.S. Cl.
CPC ..... *F02D 41/1454* (2013.01); *F02D 41/2422* (2013.01); *F02D 41/40* (2013.01); *Y02T 10/44* (2013.01)

(58) Field of Classification Search
CPC ............... F02D 41/40; F02D 2041/389; F02D 2250/21; F02D 41/307; F02D 41/0055; F02D 41/005; F02D 41/0052; F02D 2041/1409; F02D 2041/141; F02D 2041/1431; F02D 2200/0402; F02D 2200/0612; F02D 41/182; F02D 41/0072; F02D 2250/38; F02D 43/00; F02D 41/3023; F02D 41/10; F02B 2275/18; F02P 5/1527; Y02T 10/47
USPC ........ 701/103, 114, 115; 123/434, 436, 672, 123/674, 681, 687
See application file for complete search history.

(56) References Cited

U.S. PATENT DOCUMENTS

| | | | | |
|---|---|---|---|---|
| 5,540,205 A * | 7/1996 | Davis | ...................... | F02D 43/00 123/486 |
| 5,657,735 A * | 8/1997 | Maki | ...................... | F02D 41/008 123/673 |
| 5,657,736 A * | 8/1997 | Maki | ................... | F02D 41/0085 123/673 |
| 5,755,094 A * | 5/1998 | Maki | ...................... | F02D 41/008 123/673 |
| 5,758,490 A * | 6/1998 | Maki | ...................... | F02D 41/008 123/674 |
| 5,806,012 A * | 9/1998 | Maki | ................... | F02D 41/1402 123/480 |
| 5,908,463 A * | 6/1999 | Akazaki | ................ | F02D 41/008 123/480 |
| 5,960,765 A * | 10/1999 | Iida | ......................... | F02D 37/02 123/295 |
| 6,095,127 A * | 8/2000 | Kolmanovsky | ..... | F02D 41/0072 123/480 |
| 7,063,076 B1 * | 6/2006 | Sun | ...................... | F02D 41/0055 123/478 |
| 7,168,422 B1 * | 1/2007 | Takata | .................. | F02D 41/064 123/674 |
| 2006/0005532 A1 * | 1/2006 | Kitahara | ............... | F02D 41/027 60/285 |
| 2007/0012289 A1 * | 1/2007 | Yamaguchi | ........... | F02D 35/028 123/406.47 |
| 2007/0012290 A1 * | 1/2007 | Yamaguchi | ........... | F02D 35/023 123/406.47 |
| 2007/0100536 A1 * | 5/2007 | Withrow | ............... | F02D 41/182 701/104 |
| 2012/0318235 A1 * | 12/2012 | Kaiser | .................. | F02D 11/105 123/350 |
| 2016/0061125 A1 * | 3/2016 | Foufas | ................ | F02D 41/1401 123/568.11 |

FOREIGN PATENT DOCUMENTS

| | | |
|---|---|---|
| CN | 1042454 C | 3/1999 |
| CN | 1044245 C | 3/1999 |
| CN | 1295649 A | 5/2001 |
| EP | 0059586 A2 | 9/1982 |
| EP | 1024275 A2 | 8/2000 |
| JP | 6296749 | 5/1987 |
| JP | H11236836 | 3/1999 |
| JP | 200281309 | 3/2002 |
| JP | 2004278334 | 10/2004 |
| WO | 9316278 A1 | 8/1993 |

OTHER PUBLICATIONS

International Search Report (Jun. 12, 2013) for corresponding International App. PCT/EP2012/004988.
International Preliminary Report on Patentability (Mar. 5, 2015) for corresponding International App. PCT/EP2012/004988.
Chinese Official Action (Jan. 25, 2017) for corresponding Chinese Application 201280077461.8.

* cited by examiner

FIG.1

FIG.2

METHOD AND SYSTEM FOR CONTROLLING FUEL INJECTION

BACKGROUND AND SUMMARY

This disclosure relates to a method for controlling fuel injection of a combustion engine. The method comprises the step of providing at least a first predetermined air-fuel mixture map and determining a first air-fuel ratio based on at least one engine operating parameter and said at least first predetermined air-fuel mixture map. The disclosure also relates to a fuel injection system for a combustion engine, wherein said fuel injection system comprising a control unit and at least a first predetermined air-fuel mixture map. The disclosure is particularly advantageous in the field of diesel engines provided with a smoke limiting control arrangement formed by at least one minimum AFR lock-up map. The method and system can for example be used on diesel engines for trucks, busses, construction vehicles, marine engines, automobiles, or the like.

Vehicle fuel economy may be improved by providing the driver with an economy mode selector. When an economy mode is selected by the driver, the engine is controlled to be less responsive, such that an improved fuel economy can be attained. However, the specific engine control settings that give raise to the less responsive engine in the economy mode generally requires extensive, time consuming and costly additional development of the engine control software. There is thus a need for an improved engine control that removes the above mentioned disadvantages.

The disclosure concerns, according to an aspect thereof, a method for controlling fuel injection of a combustion engine, which method comprises the steps of:

providing at least a first predetermined air-fuel mixture map and determining a first air-fuel ratio based on at least one engine operating parameter and said at least first predetermined air-fuel mixture map, determining a second air-fuel ratio that is offset with a first constant value from said first air-fuel ratio determining, if a first operating mode or a second operating mode is selected;

controlling engine fuel injection according to said first air-fuel ratio when a currently requested fueling rate results in a smaller air-fuel ratio than said first air-fuel ratio and said first operating mode is selected; or alternatively controlling engine fuel injection according to said second air-fuel ratio when a currently requested fueling, rate results in a smaller air-fuel ratio than said second air-fuel ratio and said second operating mode is selected.

The first operating mode may represent a standard default operating mode, whereas the second operating may typically represent a first economy mode.

The method and system is closely associated and partly integrated with an engine smoke limiting control arrangement, and in particular the predetermined minimum allowed air-fuel mixture map, hereinafter referred to as air-fuel ratio (AFR) map, of the smoke limiting control arrangement. This AFR map has been developed for minimizing transient visible smoke out of the engine. Transient visible smoke is a direct result of operating the engine on a low AFR. By defining a minimum allowed AFR level, which consequently corresponds to a maximal allowed fueling, rate, the minimum allowed AFR level may be set large enough to avoid or at least reduce the level of transient visible smoke. The idea is to add a constant offset value to the looked-up AFR value and use this offset AFR value as the minimum allowed AFR level when an engine economy operating mode is selected by the driver.

This solution represents a very cost-effective, straightforward, and simple solution for creating a complete economy operating mode engine setting. The major part of the engine control system that relates the AFR value and the engine control logic that use this AFR value is already existing, and the only additional software modification is the addition of the constant offset value to the AFR value that is identified using the existing AFR map, as well as a economy operating mode selector and associated output signal processing. Compared with the previously known solution, where possibly an entire new expensive and time-consuming fuel injection map was developed purely for the economy operating mode, or where possibly the vehicle acceleration is limited for all vehicle operating conditions, the new solution according to the present disclosure represents a significant improvement.

This solution is highly flexible. Since the only modification relates to introducing at least one AFR offset value, the offset value itself can be easily changed to fit different vehicles, different operators, different customers, or the like. Two, three or more economy operating modes may also be implemented without almost any further development and testing.

This solution further represents an efficient fuel economy engine setting, that reduces fuel consumption without necessarily evoking the often associated impression of a power less engine. Low AFR values are normally only occurring when the driver desires high engine output (high fueling rate) at times of low air mass flow rate (small amount of available fresh air due to turbo lag, high EGR flow, etc.) into the engine. This situation occurs typically during engine transient condition, i.e. during situations where a large and sudden change in engine output is requested. The engine will in the economy operating mode consequently behave as a conventional strong engine during most of the time, and only reduce engine output during certain engine transient conditions.

The disclosure further relates to a corresponding fuel injection system for a combustion engine, which system exhibits the same advantages as described above.

The method may comprise the steps of determining if a first operating mode, a second operating mode or a third operating mode is selected; determining a third air-fuel ratio that is offset with a second constant value from said first air-fuel ratio, wherein said second constant value is larger than said first constant value; and controlling engine fuel injection according to said third air-fuel ratio when said currently requested fueling rate results in a smaller air-fuel ratio than said third air-fuel ratio and said third operating mode is selected. The first operating mode may represent a standard default operating mode, whereas the second operating may represent a first economy operating mode, and the third operating may represent a second economy operating, mode that is more stringent designed than the basic economy operating mode, i.e. an operating mode that results in a further improved fuel economy.

The method may comprise the step of additionally providing at least a second predetermined air-fuel mixture map, wherein each of said at least first and second air-fuel mixture map corresponds to different predetermined engine operating states, and determining, said first air-fuel ratio based on at least one engine operating parameter and the currently selected air-fuel mixture map. The engine control system may be supplied with several different engine operating, states, such as an increased heat operating state for improved exhaust aftertreatment system regeneration, or a low emission operating state for avoiding that any regulatory torque reduction inducement system will lead to a reduction in maximum available engine torque.

The method may comprise the step of controlling at least an EGR valve for temporarily enabling increased air mass flow rate into the engine when a current air-fuel ratio is within a first constant range of said first air-fuel ratio and said first operating mode is selected, and controlling at least said EGR valve for temporarily enabling increased air mass flow rate into the engine when said current air-fuel ratio is within said first constant range of said second air-fuel ratio and said second operating mode is selected. This arrangement serves to reduce the need for limiting the fueling rate, and is therefore not really a fuel economy improvement feature, but more a measure for maintaining engine output power. Hence, instead of hitting the fueling rate limiter the system strives to initially solve the momentarily high torque request by stopping the EGR flow, and consequently increasing the air mass rate of fresh air.

The term "air-fuel mixture" used herein is considered to encompass all types of definitions relating to air-fuel mixtures at any given moment. It is commonly defined in terms of "air-fuel ratio (AFR)", i.e. the ratio of air to fuel. A low AFR thus indicates a more rich mixture, and high AFR indicates a more lean mixture. However, many other terms are used for the air-fuel mixture, such as "mixture" alone, "fuel-air ratio (FAR) or lambda. Lambda ($\lambda$) is the ratio of actual AFR to stoichiometry for a given mixture.

BRIEF DESCRIPTION OF DRAWINGS

In the detailed description of the disclosure given below reference is made to the following figure, in which.

DETAILED DESCRIPTION

Various aspects of the disclosure will hereinafter be described in conjunction with the appended drawings, wherein like designations denote like elements, and variations of the disclosed aspects are not restricted to the specifically shown embodiments, but are applicable on other variations of the disclosure.

Figure 1:
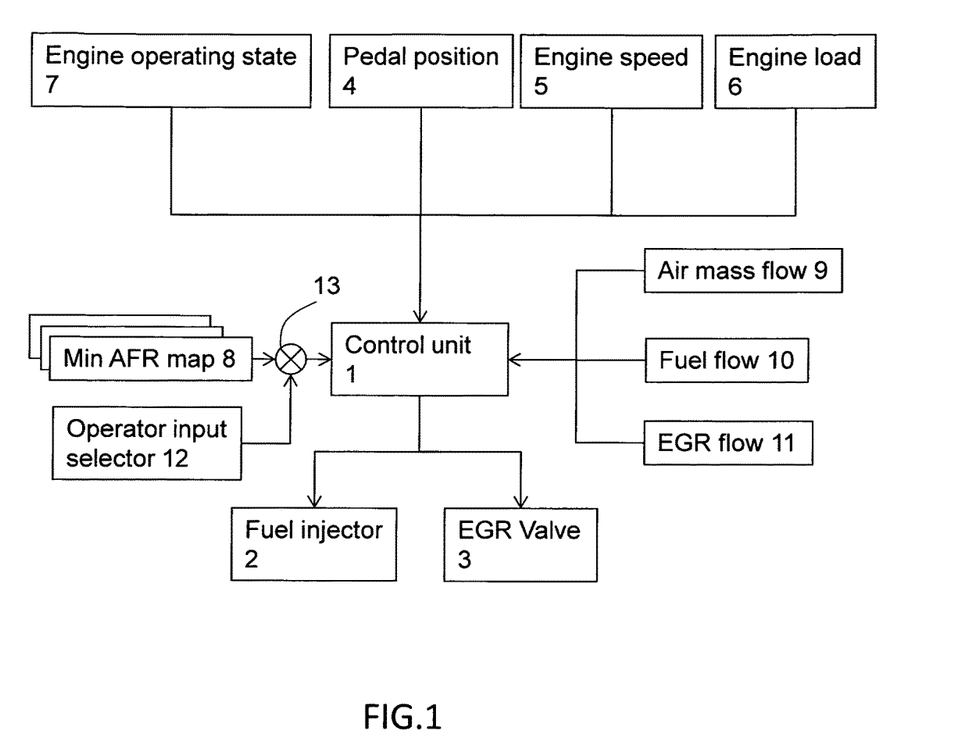
FIG. 1 shows a schematic layout of the system according to the disclosure.

FIG. 1 shows a schematic layout of a fuel injection system for an internal combustion engine, in particular a diesel engine. The fuel injection system comprises a control unit 1 that controls the amount of fuel injected into the combustion chamber by means of a fuel injector 2, as well as the timing of each fuel injection event. The control unit 1 also controls the actuation of an exhaust gas recirculation EGR valve 3, such that the engine EGR flow can be controlled. The control unit 1 controls the fuel injector 2 and EGR valve based primarily on present pedal position 4, present engine speed 5 and present engine load 6. Pedal position 4 and engine speed 5 may be easily measured by suitable sensors. The engine load may also be measured by for example a driving torque sensor applied to a drive shaft, but may alternatively or in addition be calculated based on present engine setting, such as present AFR, and engine load. The fuel injection control may be implemented by means of any conventional feed-back controller or the like.

Note here that FIG. 1 represents a highly simplified layout of the fuel injection system and that the system upon implementation preferably is arranged with a more decentralised and complex layout, where for example the control unit 1 is implemented by means of a main control unit, which transmits control commands to sub control units, such as for example a fuel injector controller and EGR controller, etc. Furthermore, the control unit 1 may be configured to control also other non-showed parts and subsystems of the vehicle, in particular relating to the engine and the fuel injection system, such as possibly the fuel pump. The control unit 1 may also receive input signals from other non-showed sensors and systems of the vehicle, in particular relating to the engine and the fuel injection system for improved control of the fuel injection system. The disclosed input parameters only represent an exemplary selection of parameters that the control unit may rely on.

The fuel injection system may additionally be provided with at least two different engine operating states, such as for example increased heat operating state or low emission operating state. The increased heat operating state may fir example by characterised by additional late fuel injections for supplying un-burnt fuel to the exhaust aftertreatment system, thereby increasing the temperature there, as is well-known in the art. The low emission operating state may for example result in reduced emission levels such as NOx, C02, CO, PM or the like on the cost of a reduced engine output power. Such an engine operating state may be selected by or commanded to the control unit 1 during certain conditions. The present engine operating state 7 is mainly selected automatically by an engine controller without driver intervention.

The fuel system further comprises an engine exhaust smoke limiting control for limiting the amount of visible exhaust smoke emitted by the engine. The smoke limiting control comprises at least one minimum AFR map 8 with lookup data concerning minimum AFR values. Each of the minimum AFR values in the minimum AFR map 8 is associated with certain engine operating parameters, such as engine speed and/or engine load. As a result, the control unit 1 may for a certain engine speed and engine load identify an individual minimum AFR value. The Minimum AFR map 8 generally comprises a set of AFR data points for each parameter, such as engine load, and in lack of sufficient map resolution the control unit 1 may interpolate neighbouring AFR data points to identify an AFR value for each possible engine operating point. The smoke limiting, control subsequently compares the identified minimum AFR value with a calculated AFR value based on identified present air mass flow 9, fuel flow 10, and possibly also EGR flow 11 if an EGR system is provided to the engine. As long as the calculated AFR value is higher than or equal to the identified minimum AFR value, the control unit 1 does not interfere with the desired engine torque as provided by the driver, and will command a fueling rate corresponding to the driver requested fueling rate. However, in case the calculated AFR value is lower than the identified minimum AFR value, the control unit 1 will not command fuel injection according to the requested engine torque as provided by the driver, but instead limiting the fuel injection rate, i.e. limiting the fueling, such as to not exceed the identified minimum AFR value, in order to prevent excessive visible exhaust gas smoke being emitted from the engine.

The fuel injection system may further comprise at least two different minimum AFR maps 8, where each of said maps corresponds to a separate engine operating state. The number of separate minimum AFR maps 8 is however preferably kept to a minimum to avoid, costly and time-consuming development and updates thereof.

The fuel injection system comprises an operator input selector 12 that may be actuated by the driver for determining desired engine operating mode, such as normal operating mode or fuel economy operating mode. The selector 12 may be of any suitable type, such as a mechanical selector in the form of a push button, knob or handle, or a electronic selector in the form of a graphical illustration on a display that enables the driver to select between at least two different operating modes, i.e. at least a normal operating mode and an economy operating mode, whereby the economy operating mode results in improved fuel economy compared with the normal operating mode. The control unit 1 continuously monitors the present AFR value and compares with the present minimum AFR value as derived from the relevant minimum AFR map 8. The control unit 1 is also receiving information about the selection of the operator input selector 12. When the operator input selector 12 is set to normal operating mode, the control unit 1 will function as previously described in a conventional manner. However, as soon as the operator input selector 12 is set to economy operating mode, a predetermined offset value is added to the First AFR value. As a result, the control unit 1 will begin to limit the fueling rate at higher AFR values, i.e. the system will limit the fueling rate to a larger degree than previous, and not only when the exhaust gas smoke level is considered too high.

Worth noting is that since the fueling limitation will only occur at relatively low AFR values fuel saving will mainly occur during transient conditions. A typical transient condition is when the driver suddenly pushes the accelerator pedal to large degree, which action corresponds to a large level of increased desired driving torque. This quick and large increase in fueling rate results in a corresponding reduction of the calculated AFR value, especially if the rotation speed of the turbo charger was initially low and boosting of the air intake pressure will require some time to reach an appropriate level. When driving the vehicle outside transient conditions, the turbo will to a large extent provide the necessary air intake pressure to ensure a high AFR value, and the driver will not necessarily associate the economy operating mode with a power-less and unresponsive engine.

The predetermined offset added to the identified AFR value in the minimum AFR map 8 enables a highly flexible, cost-effective and attractive solution for providing an engine economy operating, mode, which solution is also easy to implement. The actual adding of the offset may be realised in many ways. The control unit 1 may for example add the offset value to the identified AFR value. Alternatively, an intermediate unit may be provided that delivers to the control unit 1 the AFR value to be used by the control unit 1 whereby the intermediate unit has access to the minimum AFR map 8 and receives information regarding the operator input selector 12 setting, engine speed 5 and engine load 6. According to still an alternative, an additional minimum AFR imp is generated based on the minimum AFR map 8 and the predetermined offset value, such that the entire additional minimum AFR map is offset with respect to the minimum AFR map 8. The control unit 1 is then configured to select which AFR, map to use based on the present setting of the operator input selector 12.

Figure 2:
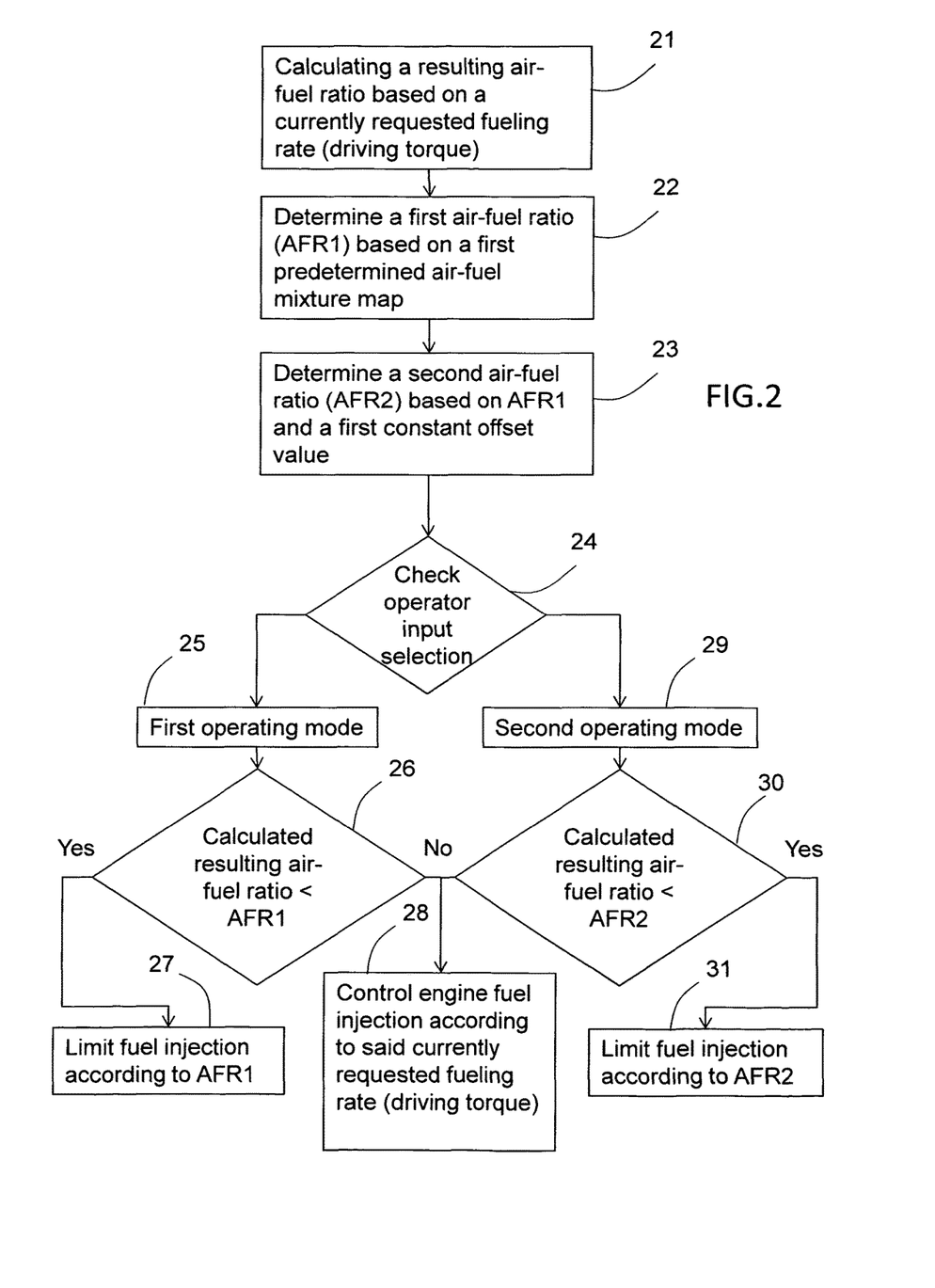
FIG. 2 shows an exemplary flow chart for carrying out the method according to the disclosure.

The method and system is hereafter described, in conjunction with an exemplary simplified and schematic flow chart depicted in FIG. 2. The flow chart can be interpreted to represent one single control sequence, which is configured to be repeatedly executed on a continuous basis with a high clock rate. The sequence may for example be executed once for each fuel injection cycle, which corresponds to a 360 degree rotation of the engine crankshaft.

In the disclosed embodiment of FIG. 2, the first step 21 of the method includes calculation of a resulting air-fuel ratio based on a currently requested fueling rate. This step thus essentially involves acquiring information about present air mass flow, present EGR flow if available, currently requested driving torque for conversion to currently requested fueling rate, and subsequently calculating the air-fuel ratio that is estimated to result from said parameters.

In a second step 22 a first air-fuel ratio AFR1 is determined based on a first predetermined air-fuel mixture map. The first air-fuel ratio AFR1 represents a minimum allowed air-fuel ratio when a normal engine operating mode is selected. The used air-fuel mixture map corresponds to the minimum AFR map 8 of the smoke limiting controller. The first air-fuel ratio AFR1 is thus for example determined by acquiring information about present engine speed and engine load, and identifying a first air-fuel ratio AFR1 corresponding the said engine parameters.

In a third step 23 a second air-fuel ratio AFR2 is determined based on said first air-fuel ratio AFR1 and a first constant offset value. The second air-fuel ratio AFR2 represents a minimum allowed air-fuel ratio when an economy engine operating mode is selected. Taking absolute values as example, the first air-fuel ratio AFR1 may have been determined to 20.0 for the present engine speed and load, the first constant offset value being for example 1.0, then the second air-fuel ratio AFR2 is determined to 21.0. The minimum AFR value for an economy operating mode is always a higher than a minimum AFR value for a normal operating mode to accomplish a fuel saving effect.

At a fourth step 24 the setting of the operator input selection 12 is evaluated to establish if the first or second operating mode 25, 29 is selected, i.e. the normal or economy operating mode. If the first operating mode 25 is selected, and a first comparison step 26 shows that the calculated resulting AFR is smaller than the first air-fuel ratio AFR1, a fuel injection limitation will be realised in a first limitation step 27 to prevent too high visible smoke emission levels. This first limitation is realised by controlling fuel injection such that the final AFR is equal to the first air-fuel ratio AFR1. However, if the first operating mode 25 is selected, and the first comparison step 26 shows that the calculated resulting AFR is larger or equal to the first air-fuel ratio AFR1 then no fuel injection limitation is required and the fuel injection level is allowed to correspond to the currently requested fueling rate in a non-limiting step 28.

Correspondingly, if it at said fourth step 24 is determined that the second operating mode 29 is selected, and a second comparison step 30 shows that the calculated resulting AFR is smaller than the second air-fuel ratio AFR2, a fuel injection limitation will be realised in a second limitation step 31 to prevent too high visible smoke emission levels. This second limitation is realised by controlling fuel injection such that the final AFR is equal to the second air-fuel ratio AFR2. However, if the second operating mode 29 is selected, and the second comparison step 30 shows that the calculated resulting AFR is larger or equal to the second air-fuel ratio AFR2, then no fuel injection limitation is required and the fuel injection level is allowed to correspond to the currently requested fueling rate in a non-limiting step 28.

The flowchart may be additionally described in terms of exemplary absolute values. The calculated resulting air-fuel ratio may for example be 20.5. If then the first operating, mode 25 is selected, than it would have been determined that calculated resulting air-fuel ratio of 20.5 is be larger than the first air-fuel ratio AFR1 of 20.0, and as a consequence no fueling limitation will be instructed by the control unit 1. However, should the second operating mode, i.e. the economy operating mode have been selected, than it would have been determined that calculated resulting air-fuel ratio of 20.5 is smaller than the second air-fuel ratio AFR2 of 21.0, and as a consequence fueling would be limited to arrive at a final air-fuel ratio equal to 21.0, such that a reduced fuel consumption is enabled.

Note here that the internal order and number of steps in the flowchart merely represents a theoretical model of the system, which in reality may be implemented in many alternative ways. The flowchart should thus be seen as one possible embodiment out of many.

Figure 3A:
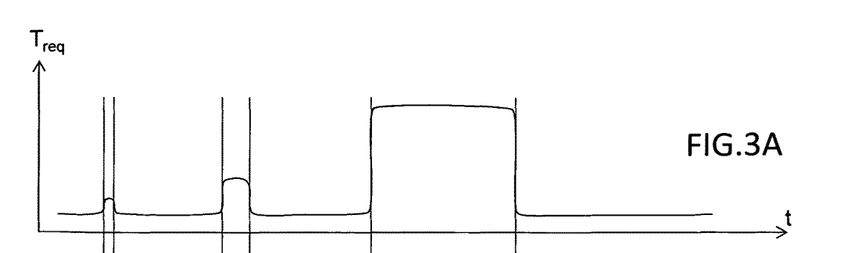
FIG. 3 shows a graphical representation of the system in operation.
Figure 3B:
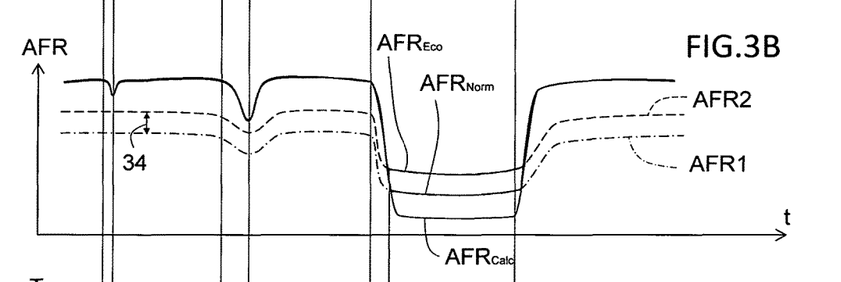
Figure 3C:
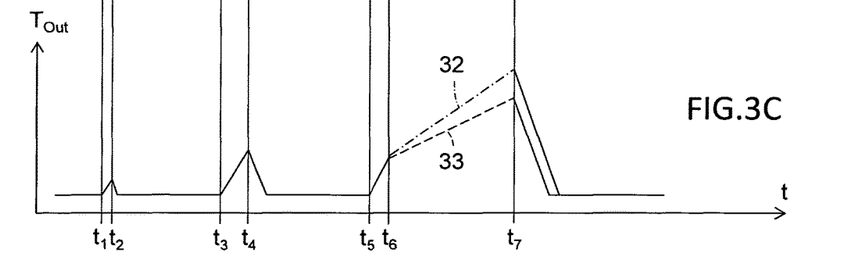

An embodiment will in addition be disclosed in the context of the schematically and very simplified time (t) diagrams of FIG. 3A-3C. FIG. 3A shows a vehicle driver torque request (Treq), which is determined based on the accelerator pedal position. The driver torque request is characterised by three rather impulse-like torque request increases around time points t1, t3, t5, each followed by an equally large torque request decrease around time points t2, t4 and t7.

In FIG. 3B the first air-fuel ratio AFR1 is plotted with a dash-dot line, and the second air-fuel ratio AFR2 is plotted with a dashed line. These lines AFR1, AFR2 consequently defines the minimum allowed engine AFR levels, depending on which engine operating mode is selected. The first air-fuel ratio AFR1 is determined based on the minimum AFR map 8, current engine speed and current engine load, as previously described. The second air-fuel ratio AFR2 is merely an offset of the first minimum air-fuel ratio AFR1 with a first constant value 34, as previously described. The first constant value 34 may be within the range of 0.2-4.0, and specifically in the range of 0.5-2.0. Plotted with a continuous line is also:

The calculated resulting AFR (AFRCalc) which results if the control unit 1 would command fuel injection according to the driver requested torque without any fueling limitation imposed by the smoke limit control;

The final AFR value (AFRNorm) when the normal operating mode 25 is selected and smoke limiting, fueling control is active; and The final AFR value (AFREco) when the economy operating mode 29 is selected.

Finally, FIG. 3C shows a plot 32 of the resulting engine torque output (Tout) from the engine plotted with operator input selector 12 in a normal operating mode, and a plot 33 of the resulting engine torque output (Tout) from the engine plotted with operator input selector 12 in an economy operating mode position, which plots 32, 33 mutually deviate between at least time points fe-t7. This deviation illustrates a difference in engine torque output during said time period, depending on in which operating mode the engine is operated in. In detail, FIG. 3C shows that the engine will deliver a reduced engine torque output in response to a relatively large sudden driver torque request when the fuel economy operating mode is selected, compared with an engine operating in the normal operating mode. As a direct result of the reduced engine output torque in the fuel economy operating mode, also the fuel consumption will be reduced during said time period.

The reason for the reduced engine output torque in the fuel economy operating mode can be identified in FIG. 3B. Analysing first AFRCalc it is clear that the driver requested torque between time points ts-t7 is so significant that AFRCalc falls below AFR1. As previously described, the smoke limiting control will therefore, with the engine in the normal operating mode, limit engine fueling such that the final AFR value (AFRNorm) does not fall down under AFR1. Instead, the engine is controlled such that AFRNorm will follow AFR1 as long as AFRCalc is below AFR1. If now the engine is operated in the economy operating mode instead, then the engine is controlled such that AFREco follows AFR2 as soon as AFRCalc is calculated to pass below AFR2. The fact that the engine will operate with AFREco instead of AFRNorm in a range about time points t6-t7 results in a reduced engine output torque, as illustrated by plot 33, and consequently a reduced fuel consumption.

FIG. 3A-3C also illustrates that the engine in the economy operating mode consumes reduced level of fuel mainly in transient conditions above a certain level. The driver torque request impulses around time points 2 and t3—are not significant enough to cause the AFRCalc to below either AFR1 or AFR7.

According to a further aspect of the disclosure, also the control of the EGR valve may be made dependent on the present setting of the operator input selector 12. When for example the current air-fuel ratio is within a first constant range of the first air-fuel ratio AFR1 and said first operating mode is selected, then the EGR valve 3 may be controlled, i.e. at least partly closed to enable temporarily increased air mass flow rate of fresh air into the engine. This may serve to prevent fueling limitation as far possible. When however the current air-fuel ratio is within a first constant range of the second air-fuel ratio AFR2 and said second operating mode is selected, also then the EGR valve 3 may be controlled to enable temporarily increased air mass flow rate of fresh air into the engine. The AFR threshold that causes activation of this special control of the EGR valve 3 is thus dependent on the setting of the operator input selector 12. The first constant range is defined by the values 0.0-10.0, and more specifically by the values 0.0-5.0.

The system and method has been described including two different operating modes, but further operating modes may be available. The operator input selector 12 may for example comprise more than two selector positions, for example three, four or more, where a first operating mode may correspond to a normal operating mode, a second operating mode may correspond to a first economy operating mode, and a third operating mode may correspond to a second economy operating mode, and so on, where the second economy operating, mode enables a higher fuel saving capability than the first economy operating mode.

Reference signs mentioned in the claims should not be seen as limiting the extent of the matter protected by the claims, and their sole function is to make claims easier to understand.

As will be realised, the disclosure may be modified in various obvious respects, all without departing from the scope of the appended claims. Accordingly, the drawings and the description thereto are to be regarded as illustrative in nature, and not restrictive.

The invention claimed is:

1. Method for controlling fuel injection of a combustion engine having at least a first operating mode and a second operating mode, which method comprises the steps of:
    providing at least a first predetermined air-fuel mixture map;
    providing a constant air-fuel mixture map offset value for the second operating mode;

determining a first air-fuel ratio based on at least one engine operating parameter and the at-least-first predetermined air-fuel mixture map;

adding the constant air-fuel mixture map offset value to the first air-fuel ratio to form a second air fuel ratio;

selecting the first operating mode and, when the first operating mode is selected, controlling engine fuel injection according to the first air-fuel ratio in response to requesting a currently requested fueling rate that results in a smaller air-fuel ratio than the first air-fuel ratio; and selecting the second operating mode and, when the second operating mode is selected, controlling engine fuel injection according to the second air-fuel ratio in response to requesting a currently requested fueling rate that results in a smaller air-fuel ratio than the second air-fuel ratio.

2. Method according to claim 1, wherein the at least first predetermined air-fuel mixture map is configured to operate as an exhaust gas smoke limiter.

3. Method according to claim 1, wherein the at least first predetermined air-fuel mixture map is provided with air-fuel mixture data for a range of engine speed and a range of engine load conditions.

4. Method according to claim 1, comprising the steps of:
providing a second constant air-fuel mixture map offset value for a third operating mode of the engine,
determining if the first operating mode, the second operating mode or the third operating mode is selected;
adding the second constant air-fuel mixture map offset value to the first air-fuel ratio to form a third air fuel ratio;
wherein the second constant air-fuel mixture map offset value is larger than the first constant air-fuel mixture map offset value, and controlling engine fuel injection according to the third air-fuel ratio when the currently requested fueling rate results in a smaller air-fuel ratio than the third air-fuel ratio and the third operating mode is selected.

5. Method according to claim 1, wherein at least one of the first and the second constant air-fuel mixture map offset value is within the range of 0.2-4.0.

6. Method according to claim 1, comprising the steps of additionally providing at least a second predetermined air-fuel mixture map, wherein the at least first and second air-fuel mixture map correspond to different predetermined engine operating states, and determining the first air-fuel ratio based on at least one engine operating parameter and the currently selected air-fuel mixture map.

7. Method according to claim 1, comprising the step of controlling at least an EGR valve for temporarily enabling increased air mass flow rate into the engine when a current air-fuel ratio is within a first constant range of the first air-fuel ratio and the first operating mode is selected, and
controlling at least the EGR valve for temporarily enabling increased air mass flow rate into the engine when the current air-fuel ratio is within the first constant range of the second air-fuel ratio and the second operating mode is selected.

8. Method according to claim 7, wherein the first constant range is defined by the values 0.0-10.0.

9. Method according to claim 1, wherein controlling engine fuel injection according to a specific air-fuel ratio comprises the steps of:

determining a minimum allowed air-fuel ratio based on currently selected predetermined air-fuel mixture map, current engine load, current engine speed, and currently selected operating mode;
continuously monitoring air mass flow rate into the engine;
determining a maximal allowed fueling rate based on the minimum allowed air-fuel ratio and the air mass flow rate;
limiting engine fueling rate to the maximal allowed fueling rate if a currently requested fueling rate is greater than the maximal allowed fueling rate.

10. Method according to claim 1, the method comprising the step of controlling engine fuel injection according to a currently requested fueling rate when the currently requested fueling rate results in an air-fuel ratio that is greater than or equal to the first air-fuel ratio and the first operating mode is selected.

11. Fuel injection system for a combustion engine, the fuel injection system comprising a control unit and at least a first predetermined air-fuel mixture map, wherein the fuel injection system comprises an operator input selector that is configured to be selectable between at least a first operating mode and a second operating mode, and the system comprises a first constant air-fuel mixture map offset value for the second operating mode;
the control unit being configured to
determine a first air-fuel ratio based on at least one engine operating parameter and the at least first predetermined air-fuel mixture map;
determine a second air-fuel ratio by adding the first constant air-fuel mixture map offset value to the first air-fuel ratio,
control engine fuel injection according to the first air-fuel ratio in response to requesting a currently requested fueling rate that results in a smaller air-fuel ratio than the first air-fuel ratio when the first operating mode is selected; and
control engine fuel injection according to the second air-fuel ratio in response to requesting a currently requested fueling rate results in a smaller air-fuel ratio than the second air-fuel ratio when the second operating mode is selected.

12. Fuel injection system according to claim 11, wherein the at least first predetermined air-fuel mixture map is configured to operate as an exhaust gas smoke limiter.

13. Fuel injection system according to claim 11, wherein the at least first predetermined air-fuel mixture map is provided with air-fuel mixture data for a range of engine speed and a range of engine load conditions.

14. Fuel injection system according to claim 11, wherein the operator input selector is configured to be selectable between at least a first operating mode, a second operating mode, and a third operating mode, and the system comprises a second constant air-fuel mixture map offset value for the third operating mode, the control unit being configured to
determine a third air-fuel ratio by adding the second constant air-fuel mixture map offset value to the first air-fuel ratio, wherein the second air-fuel mixture map offset value is larger than the first constant air-fuel mixture map offset value, and
controlling engine fuel injection according to the third air-fuel ratio when the currently requested fueling rate results in a smaller air-fuel ratio than the third air-fuel ratio and the third operating mode is selected.

15. Fuel injection system according to claim 11 wherein at least one of the first and the second constant air-fuel mixture map offset value is within the range of 0.2-4.0.

16. Fuel injection system according to claim 11, wherein the fuel injection system additionally comprises at least a second predetermined air-fuel mixture map, wherein each of the at least first and second air-fuel mixture map corresponds to different predetermined engine operating states, the control unit being configured to determine the first air-fuel ratio based on at least one engine operating parameter and the currently selected air-fuel mixture map.

17. Fuel injection system according to claim 11, wherein the control unit being is configured to
- control at least an EGR valve for temporarily enabling increased air mass flow rate into the engine when a current air-fuel ratio is within a first constant range of the first air-fuel ratio and the first operating mode is selected; and
- control at least the EGR valve for temporarily enabling increased air mass flow rate into the engine when the current air-fuel ratio is within the first constant range of the second air-fuel ratio and the second operating mode is selected.

18. Fuel injection system according to claim 17, wherein the first constant range is defined by the values 0.0-10.0.

19. Fuel injection system according to claim 11, wherein the control unit, for the purpose of controlling engine fuel injection according to a specific air-fuel ratio, is configured to
- determine a minimum allowed air-fuel ratio based on currently selected predetermined air-fuel mixture map, current engine load, current engine speed, and currently selected operating mode;
- continuously monitor air mass flow rate into the engine;
- determine a maximal allowed fueling rate based on the minimum allowed air-fuel ratio and the air mass flow rate;
- limit engine fueling rate to the maximal allowed fueling rate if a currently requested fueling rate is greater than the maximal allowed fueling rate.

20. A computer programmed for performing all the steps of claim 1.

21. A computer program product comprising a program stored on a non-transitory computer readable medium for performing all the steps of claim 1.

22. A computer system for implementing a method for controlling fuel injection of a combustion engine, which method comprises the steps of:
- providing at least a first predetermined air-fuel mixture map,
- providing an operating mode selector allowing selection between at least a first operating mode and a second operating mode of the engine, and
- providing a constant fuel-mixture map offset value for the second operating mode, and
- determining a first air-fuel ratio based on at least one engine operating parameter and the at-least-first predetermined air-fuel mixture map;
- adding the constant fuel-mixture map offset value to the first air-fuel ratio to form a second air fuel ratio;
- selecting the first operating mode and, when the first operating mode is selected, controlling engine fuel injection according to the first air-fuel ratio in response to requesting a currently requested fueling rate that results in a smaller air-fuel ratio than the first air-fuel ratio; and
- selecting the second operating mode and, when the second operating mode is selected, controlling engine fuel injection according to the second air-fuel ratio in response to requesting a currently requested fueling rate results in a smaller air-fuel ratio than the second air-fuel ratio.

23. Method according to claim 1, the method comprising the step of controlling engine fuel injection according to currently requested fueling rate when the currently requested fueling rate results in an air-fuel ratio that is greater than or equal to the second air-fuel ratio and the second operating mode is selected.

* * * * *